UNITED STATES PATENT OFFICE.

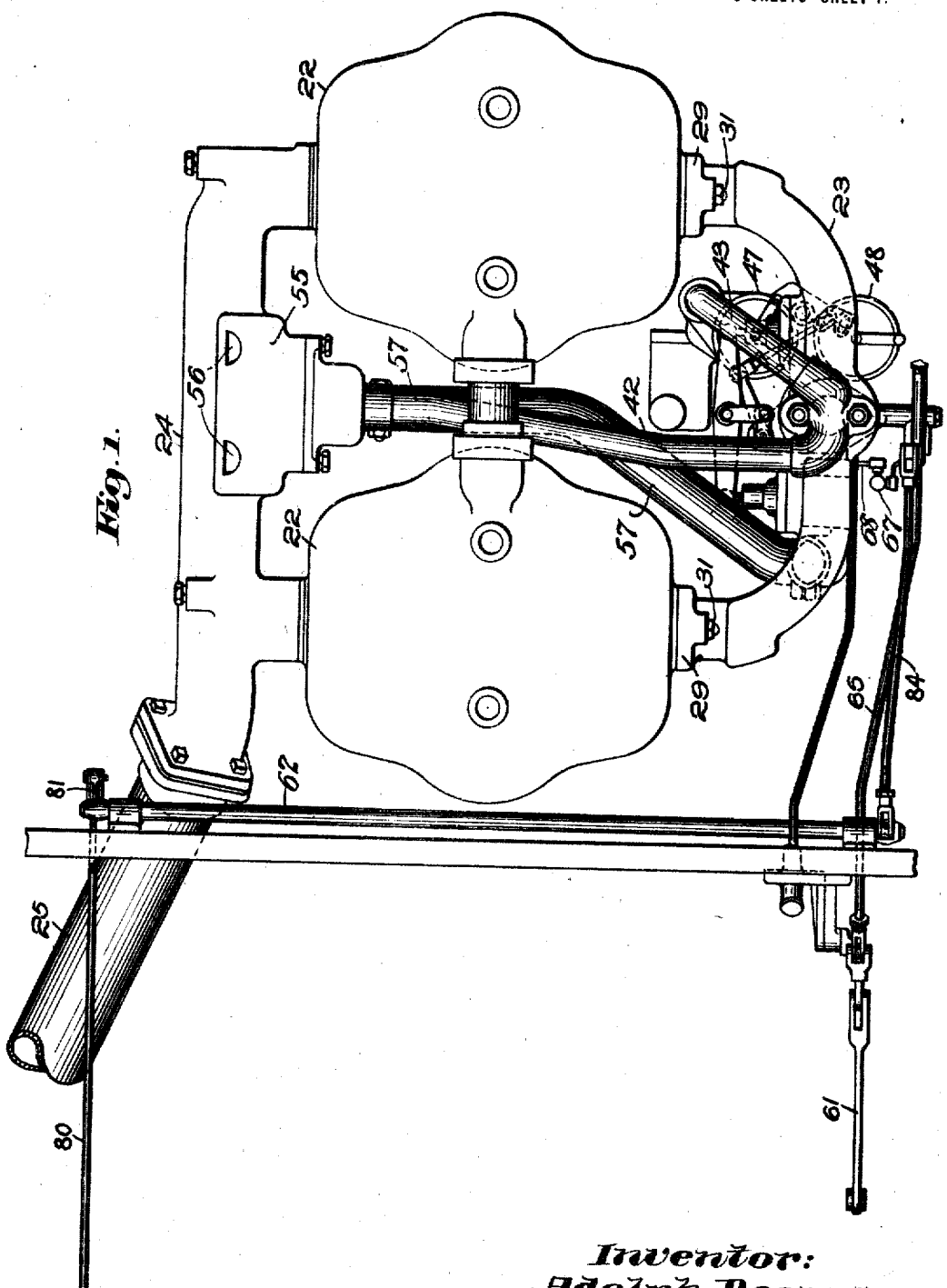

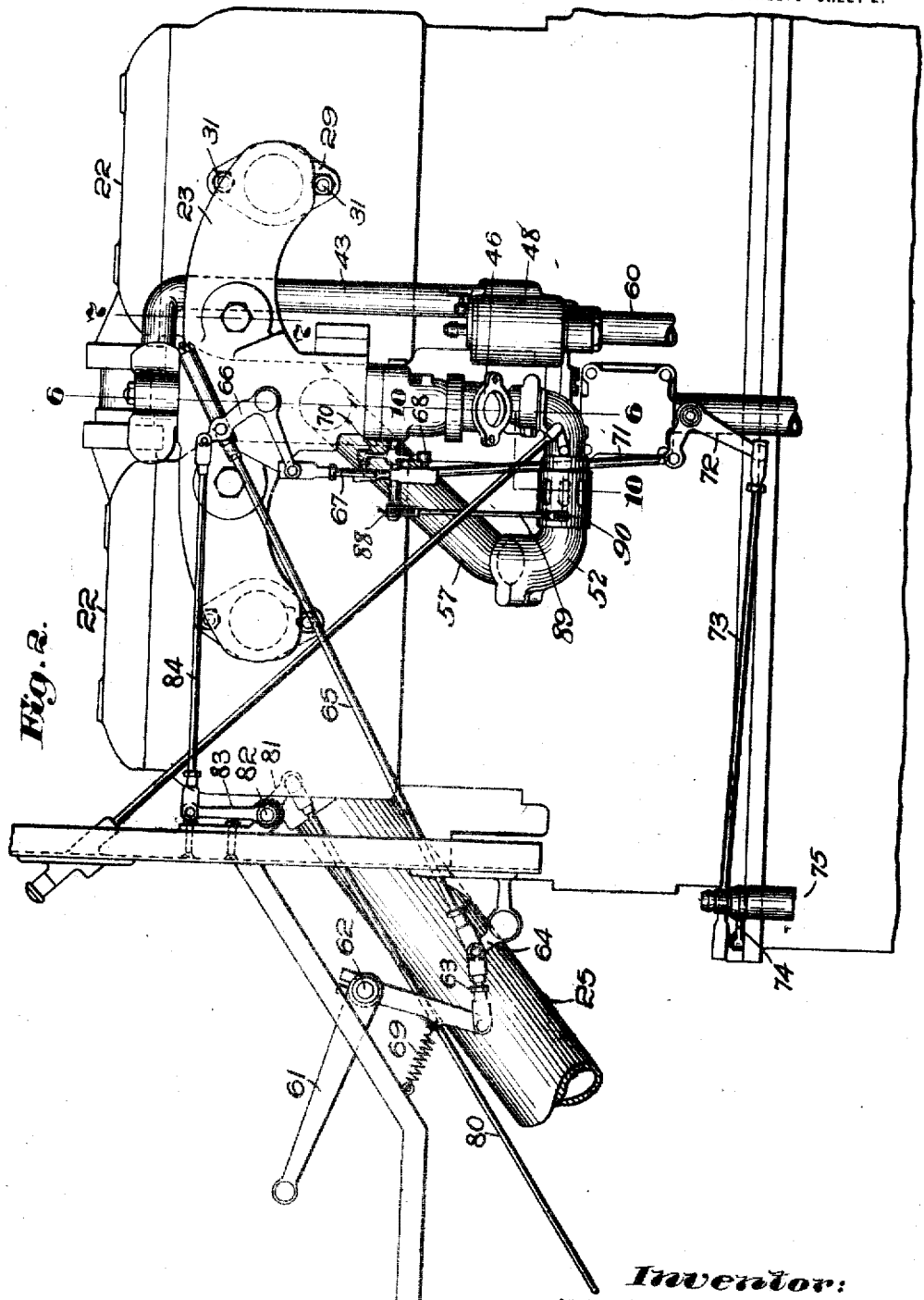

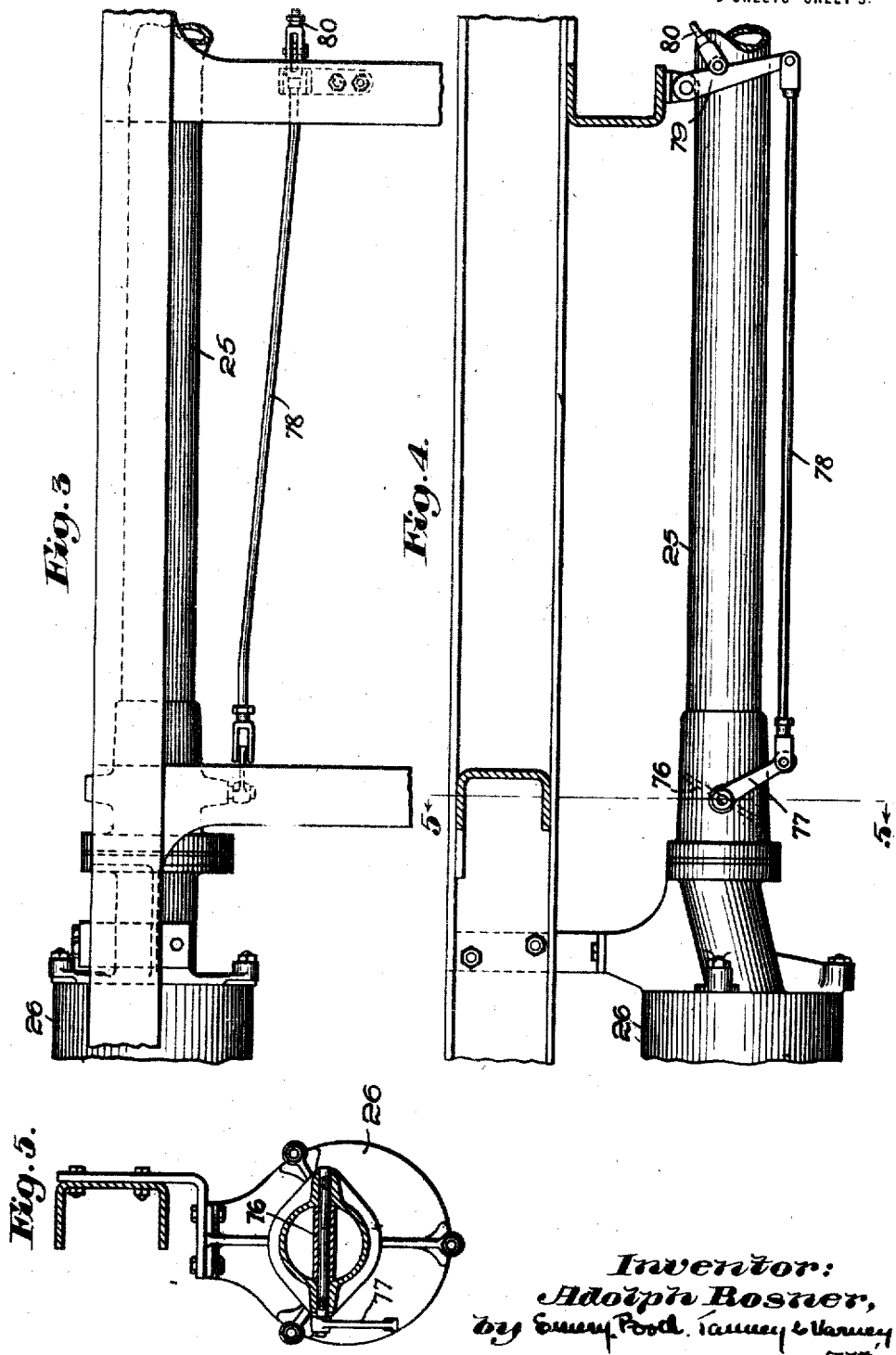

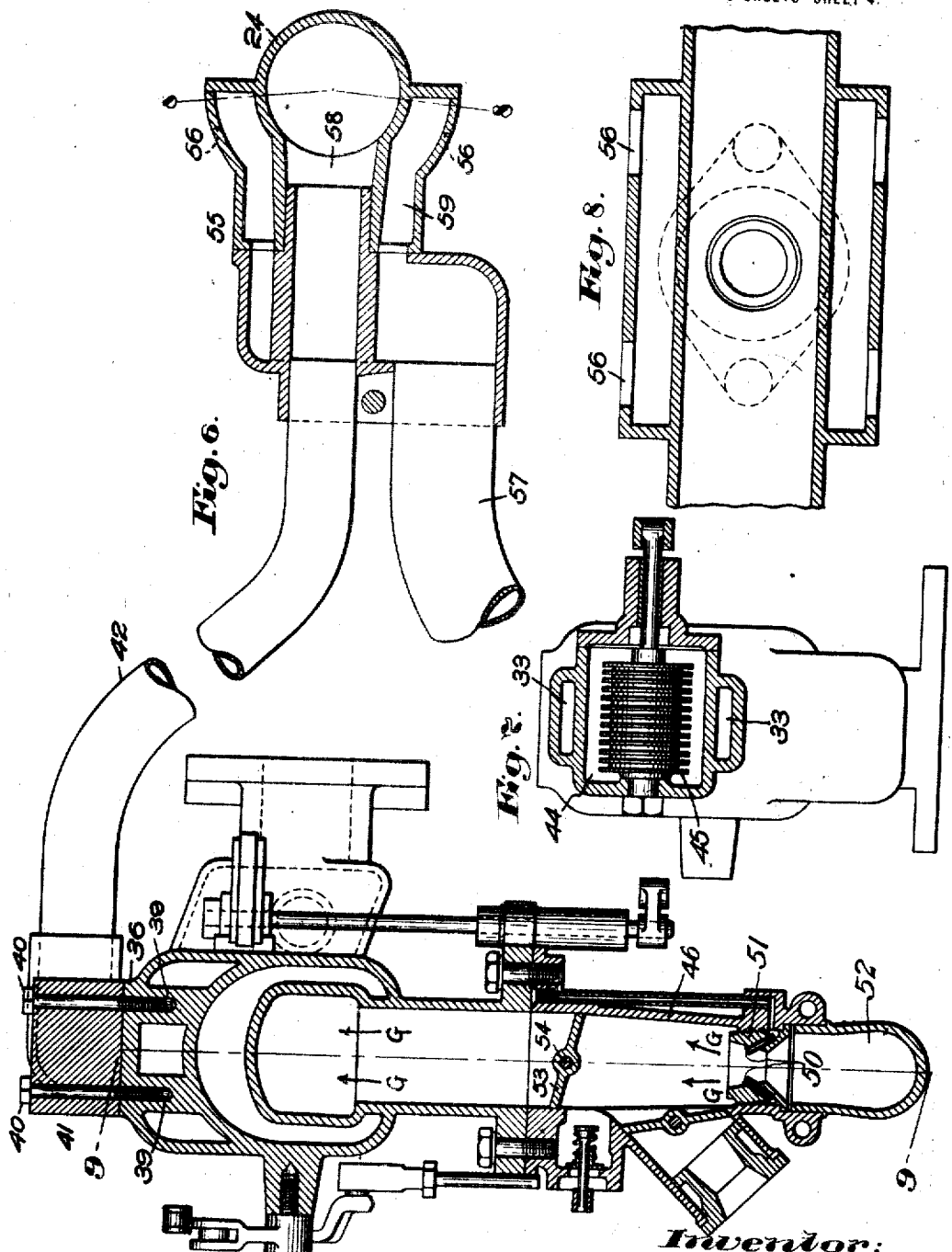

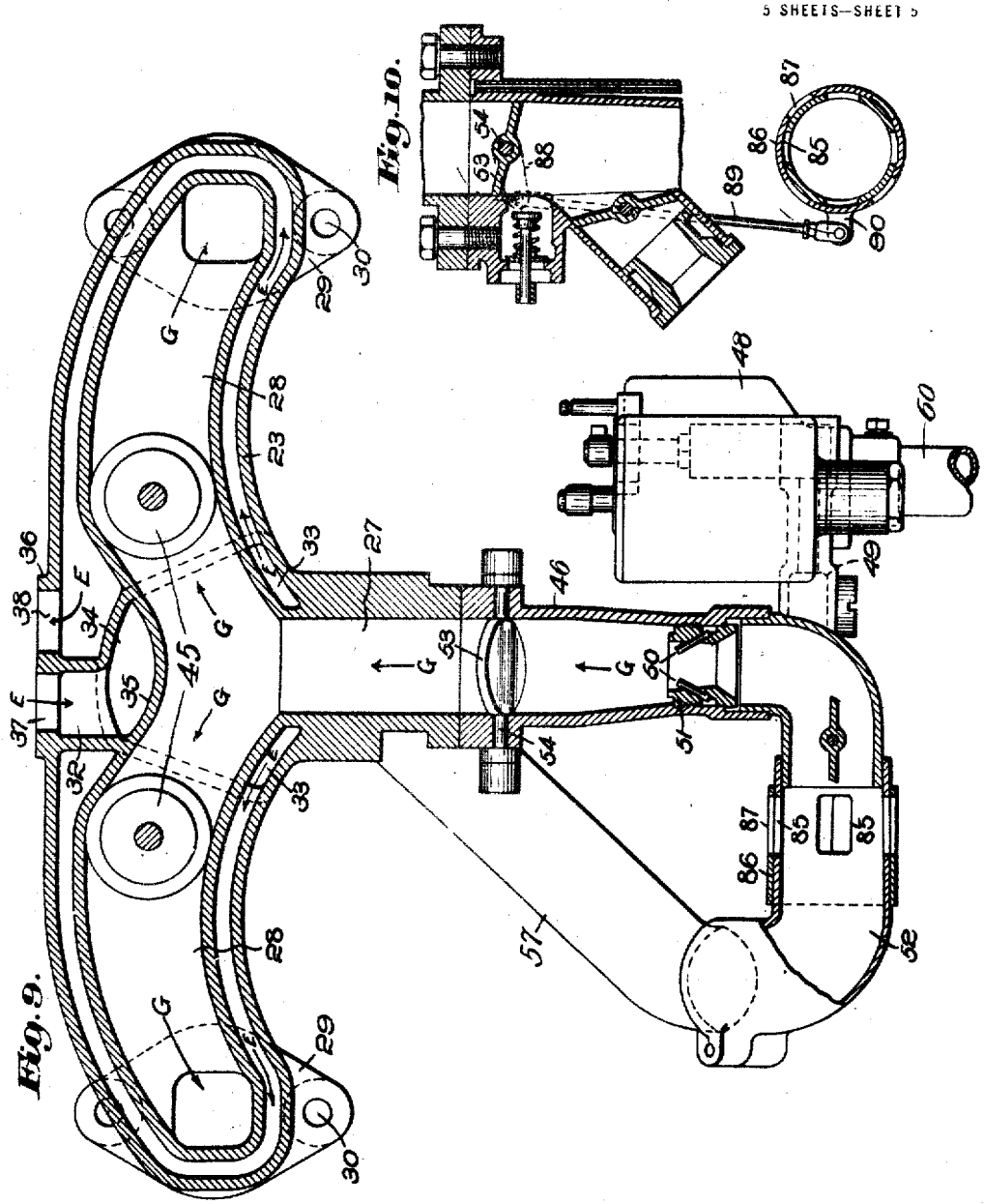

ADOLPH ROSNER, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

FUEL SYSTEM FOR INTERNAL-COMBUSTION ENGINES.

1,350,421.  Specification of Letters Patent.   Patented Aug. 24, 1920.

Application filed August 9, 1918. Serial No. 249,124.

*To all whom it may concern:*

Be it known that I, ADOLPH ROSNER, a citizen of the United States, and a resident of Bridgeport, county of Fairfield, and State of Connecticut, have invented an Improvement in Fuel Systems for Internal-Combustion Engines, of which the following description, in connection with the accompanying drawings, is a specification, like characters on the drawings representing like parts.

This invention relates to fuel systems for internal combustion engines, and is more especially concerned with the control of the temperature of the combustible mixture, the system being particularly advantageous in the handling of the heavier fuels, such as kerosene.

My invention will be best understood by reference to the following description, when taken in connection with the accompanying drawings of one specific embodiment thereof, while its scope will be more particularly pointed out in the appended claims.

In the drawings:

Figure 1 is a plan of an internal combustion engine equipped with a fuel system embodying my invention, a portion only of the latter being illustrated in this view;

Fig. 2 is a side elevation of the parts shown in Fig. 1;

Fig. 3 is a plan of the remainder of the fuel system and constitutes in effect a continuation of Fig. 1;

Fig. 4 is a side elevation of the parts shown in Fig. 3, and constitutes in effect a continuation of Fig. 2;

Fig. 5 is a sectional view on line 5—5 of Fig. 4;

Fig. 6 is a sectional view, on an enlarged scale, on line 6—6 of Fig. 2;

Fig. 7 is a sectional view, on an enlarged scale, on line 7—7 of Fig. 2;

Fig. 8 is a sectional view on line 8—8 of Fig. 6;

Fig. 9 is a sectional view on line 9—9 of Fig. 6; and

Fig. 10 is a detail sectional view, on an enlarged scale, on the irregular line 10—10 of Fig. 2.

Referring to the drawings, and to the embodiment of my invention which is illustrated therein, I have shown (see Figs. 1 and 2) an internal combustion engine of the four-cylinder type, having its cylinders cast in pairs 22—22, and receiving their supply of combustible mixture from any appropriate intake manifold, such as a manifold 23. The exhaust gases may be carried away by an exhaust manifold 24, to which is connected an exhaust pipe 25 leading to a muffler 26.

While the intake manifold may be of any usual or desired construction, I have herein shown a manifold which *per se* is not my invention, the same being provided with a fuel intake passage having an inlet trunk 27 and two branches 28 to conduct the vaporized fuel to the engine cylinders 22, to which the manifold may be secured in any suitable manner, as by providing the same with flanges 29 having holes 30 to receive usual studs 31. The mixture of air and fuel drawn from the carbureter hereinafter described into the inlet trunk 27 flows through the branches 28 to the engine cylinder in streams whose directions are indicated by several arrows G in Figs. 6 and 9.

In the use of the grades of gasolene now being supplied, and more especially in cases where it is attempted to use kerosene or a distillate as a fuel, much difficulty is experienced owing to the fact that the vaporized fuel has a strong tendency to condense. Some of the liquid fuel is deposited in the intake passages, and some is carried even into the cylinders. This is attended by several undesirable results, including the rapid formation of carbon deposits, to say nothing of the lack of economy and the difficulties had with the proper functioning of the engine. These troubles are too well known to require further description.

In the intake manifold selected for illustration, there is provided a heating fluid passage adapted to receive some suitable hot fluid, such as the exhaust from the engine. This stream of heating fluid is conducted in proximity to the fuel passages, and in such a manner as to secure the best possible results. In the present example, I have shown a heating fluid passage having a trunk 32 (see Fig. 9) and two branches 33 leading therefrom. The inlet trunk 32 for the heating fluid is adjacent the inlet trunk 27 for the combustible mixture, and one trunk leads in the opposite direction with respect to the other. The arrangement is such that the heating fluid is brought into the manifold transversely of the branch passages 28 of the fuel conduit, and is then conducted about the incoming stream of gaseous fluid through the use of a chamber 34, which in turn communicates with the branches 33.

At this point where the fuel enters and is divided into two streams, there is provided what is known as a hot spot, at which the heat is concentrated just as the mixture of vaporized fuel and air leaves the carbureter. At the lower part of the chamber 34, where the inlet trunk 32 delivers the hot exhaust, said chamber is provided with a wall 35 extending in general direction transversely of the stream of vaporized fuel and air which enters the fuel intake trunk 27. Both streams impinge in the opposite directions on opposite surfaces of the wall 35, thus perfecting the vaporization of the hydro-carbon, which is more or less in the condition of a fog mixture when it strikes the surface.

By reference to Fig. 9, it will be observed that the branches 33 lead from the chamber 34 in a downward direction about the sides of the fuel conduit to a point beneath the branches of the latter, and then longitudinally of and beneath said branches. By this means, any liquid fuel gravitating to the bottom of the fuel passage is subjected to the heating effect of the stream of hot exhaust from beneath, and is revaporized. The branches 33 lead then in an upward direction transversely of the branches 28, as best shown at the extreme right and left-hand ends of Fig. 9, and then above and longitudinally of the branches 28 and in the opposite direction, as best shown in the upper portion of Fig. 9. The direction of the exhaust gas is indicated by the several arrows E in Fig. 9.

Any suitable provision may be made for connecting the heating fluid passages to suitable conduits to conduct the heating fluid to and from the manifold, but in the present example, I have provided the latter with a boss 36, best shown in Figs. 6 and 9, having an opening 37 for the entrance and an opening 38 for the exhaust of said fluid. Herein this boss is provided with threaded openings 39 to receive studs 40, by means of which the manifold may be secured to the header 41, to which are connected conduits 42 and 43. In Fig. 7, the branches 28 are shown somewhat enlarged, as at 44, to form chambers for thermostats 45, which are disposed in the path of the gaseous fuel on opposite sides of the inlet trunk 27, and in positions best calculated to provide for their use in controlling the supply of fuel,—that is to say, shifting from a light fuel to a heavier one and vice versa, such control, however, forming no part of my invention.

As a means for supplying a combustible mixture to the intake manifold, I have herein shown a carbureter 46, which *per se* forms no part of my invention, and which it is unnecessary here to show or to describe in detail, except that it may be noted that the carbureter selected for illustration is one of a type using two fuels, one a highly-explosive hydro-carbon such as gasolene, and the other a heavier and less explosive hydro-carbon such as kerosene, or a distillate. To this end, the carbureter selected for illustration is provided with two usual and well-known float chambers 47 and 48, either of which is adapted to deliver liquid fuel through a passage 49 leading to one or more nozzles 50, which deliver streams of atomized fuel into the throat of a Venturi tube 51, best shown in Fig. 9. It is unnecessary here to describe the remaining details of the carbureter, since they have nothing whatever to do with my present invention, it being understood that the engine operates in a usual and well-known manner to draw air through an intake passage 52 and through the Venturi tube 51 into the mixing chamber thereabove, whence it is delivered into the intake manifold under the control of a suitable throttle valve 53, herein of the well-known butterfly type having a stem 54. Preferably, a portion of the air supply to the intake passage 52 is heated by some appropriate means, such as a stove 55, best shown in Fig. 6, herein formed as a part of the exhaust manifold 24, and having a plurality of openings 56 best shown in Fig. 8, through which atmospheric air is taken, heated by the walls of the stove, and delivered through a suitable conduit 57 to the intake passage 52, as best shown in Fig. 9.

Referring again to the pipe 42 (see Fig. 6) hereinbefore described, which is used to conduct exhaust gas to the intake manifold to heat the latter, said pipe may be connected to the exhaust manifold 24 in any appropriate manner, but I have herein provided the stove 55 with an inner passage 58 and an outer surrounding passage 59. The inner passage provides means of communication between the exhaust manifold 24 and the pipe 42, while the surrounding passage 63 provides a way of communication between the inlet ports 56 and the pipe 42. By this means, the hot gases, passing through the passage 58 in the pipe 42 leading to the intake manifold, heat the incoming air in the surrounding passage 59 before such air passes through the pipe 57 to the intake of the carbureter. The exhaust gases, after heating the intake manifold, are conducted from the latter through the pipe 43 and a pipe 60 to any suitable point.

Now it must be evident that, in a system of this kind, when the engine is operated at high speed or under a heavy load, and with a comparatively wide throttle opening, the engine generates more heat than is the case when the engine is running at a slower speed and under a lighter load, especially when it is idling. This difference is well illustrated by the difference between the conditions which obtain when a motor vehicle is ascending a grade, as compared with those which exist when the vehicle is descending, especially as in the latter case the engine is usually idling, but the forward motion of the vehicle, due to the down grade, produces a more or less rapid cooling effect. It is obvious that, unless special provision is made, the fuel system will receive too much heat when the engine is running under a heavy load or at high speed, and not enough when it is running under a light load or at low speed. To the end that these difficulties may be avoided, I have provided interconnecting means between the fuel throttling means and the fuel heating means to cause a decreased heating effect accompanying an increased fuel supply on the one hand, and an increased heating effect accompanying a decreased fuel supply on the other hand, as I shall now describe.

In connection with fuel systems for internal combustion engines, it is customary to provide a manually-operable throttle-controlling lever, and a foot-operated throttle-controlling lever, the latter being commonly called the accelerator pedal, both of which levers are connected by suitable mechanism to the throttle valve in such a manner that either may be availed of for the control of the valve. In the present example, I have omitted any showing of the manually-operable lever, but in Figs. 1 and 2, I have shown a common form of accelerator pedal 61, fulcrumed at 62 and connected to the throttle valve stem 54 by suitable connections, including a link 63, an arm 64, a link 65, a bell-crank lever 66, a link 67 and an arm 68, the latter being secured to the valve stem. The arrangement is such that depression of the pedal 61 causes the throttle valve to open, while the latter is closed by a usual spring 69 herein connected at one end to the pedal and at its other end to a suitable fixed point. The manual control, as herein partially illustrated, includes an arm 70 secured to the throttle valve stem 54, and connected by a link 71, a bell-crank lever 72, a link 73, an arm 74, and a rock-shaft 75, the latter being usually connected to the well-known manually operable lever (not shown) which is customarily mounted on the steering column of a motor vehicle.

As a means for varying the heating effect, I have herein provided at a suitable point in the exhaust system an exhaust throttling valve 76 (see Fig. 4), herein located adjacent the inlet end of the muffler 26. When this valve is closed, as in Fig. 4, no way of escape of the exhaust into the muffler is provided, and hence the choking of the exhaust passage causes the exhaust to be diverted and compelled to flow from the exhaust manifold 24 (see Fig. 6) through the passage 58, pipe 42 and header 41, into and through the passages 32 and 33 of the intake manifold, and thence out again through the header 41 and through the pipes 43 and 60 to the atmosphere. Under these circumstances, the full heating effect of the exhaust is utilized to heat the air and the combustible mixture.

When, however, the exhaust throttling valve 76 is open, a free escape is provided past said valve into the muffler 26, and under such circumstances a small portion only of the exhaust gases will flow through the fuel and air heating system. It is desirable that the action of the exhaust throttle valve should be automatic, so that, without the operator giving the matter any thought, said valve shall close as the fuel throttle valve closes, and open as the fuel throttle valve opens. To this end, I have herein provided interconnecting means between the fuel throttle valve and the exhaust throttle valve. These means may take various forms, but in the present example (see Figs. 3 and 4) include an arm 77, link 78, lever 79, link 80, arm 81, rock-shaft 82, arm 83 and link 84, the latter being connected to the herein described bell-crank lever 66, which forms a part of the connections between the accelerator pedal 61 and the fuel throttle valve 53. The arrangement is such that, when the fuel throttle valve opens to give an increased fuel supply, the exhaust throttle valve also opens to give a decreased heating effect, and, on the other hand, when the fuel throttle valve closes to decrease the fuel supply, the exhaust throttle valve also closes to increase the heating effect.

From the foregoing, it is evident that the control of the heat supplied to the heating system is automatic, and that the heating effect is varied in accordance with the particular conditions under which the engine is operated. It follows that I have provided a means to avoid too great heating of the fuel system when the engine is operating at high speed or under heavy load, and too little heating when the engine is operating at low speed or under light load, or when it is idling.

When the engine is running on kerosene vapor under heavy load, or even under a fairly substantial load, more or less cold air can be added to the mixture, with the result that the power of the engine is increased, while at the same time effecting an economy in the fuel consumption. On the other hand, when the engine is running under light loads or idling, it is desirable to cut off, or at least substantially reduce the supply of cold air; otherwise, the kerosene will condense and work past the pistons into the crank-case. The condensation of the kerosene will also be attended by very undesirable results, including irregular running and a tendency to stall. It should be remembered that the degree of fuel throttle opening is approximately proportional to the load. I have, therefore, provided means to cause an increased supply of mixture to the engine, to be accompanied by an increased supply of cold air to the mixture, and vice versa, this being herein accomplished by coordinating the control of the throttle valve with a valve for controlling the admission of cold air. In the present embodiment, I have provided the intake conduit 52 with a plurality of ports 85, best shown in Fig. 9, regulated by a sleeve valve 86 having similar ports 87, which may be caused to register therewith to a greater or less extent, in accordance with the requirements of the engine. To this end, I have herein provided means interconnecting the throttle and cold air valves, the same comprising an arm 88 secured to the throttle valve stem 54, and connected by a link 89 to an arm 90, the latter being suitably formed on or secured to the sleeve valve 86. Preferably, the setting of the valves is such that the throttle valve has a lead over the cold air valve, or, in other words, the latter does not commence to open until after the throttle valve has opened to a substantial degree, this being well illustrated in Fig. 10. This means that when the engine is idling, or operating under light loads, no cold air is admitted to the mixture. Hence, there is no opportunity for the kerosene to condense. When, however, the throttle valve is opened to a predetermined extent, the cold air valve commences to open, and thereafter accompanies opening movement of the throttle valve, and in a certain definite relation thereto. It is also evident that, since the exhaust throttle valve is interconnected with the fuel throttle valve, the operation of all three valves is coördinated, and hence the proper amount of heat will be applied to the mixture, the correct amount of cold air will be added, and a suitable temperature maintained throughout the entire range of operation of the engine.

Having thus described one specific embodiment of my invention, what I claim and desire by Letters Patent to secure is:

1. The combination with an internal combustion engine, of means for furnishing a combustible mixture thereto, means providing for supplies of warm and cool air for the generation of said mixture, and means to cause an increased supply of mixture to said engine to be accompanied by an increased supply of cool air.

2. The combination with an internal combustion engine, of fuel supply means having provision for combining warm and cool air with fuel for the generation of the combustible mixture, means to control the admission of the mixture to said engine, means to control the admission of cool air, and means to coördinate the control of the admission of the mixture and of the cool air.

3. The combination with an internal combustion engine, of a carbureter, means for furnishing a supply of warm air thereto, means providing for the addition of a controllable supply of cool air to said warm air, means for controlling the supply of fuel from said carbureter to said engine, and means to cause an increase in the supply of fuel to be accompanied by an increase in the supply of cool air.

4. The combination with an internal combustion engine, of a carbureter, means for furnishing a supply of warm air thereto, means providing for the addition of a controllable supply of cool air to said warm air, means for controlling the supply of fuel from said carbureter to said engine, and means to cause a decreased fuel supply to be accompanied first by a decrease and subsequently a complete cessation of the cool air supply during a continuance of the fuel supply.

5. In combination with an internal combustion engine, means to supply a combustible mixture thereto, fuel admission means, a conduit for admitting air to generate the mixture from said fuel, means for heating air admitted to the conduit, cold air admission means at an intermediate point in the conduit and means for conjointly controlling the supply of mixture and the cold air admission means.

6. The combination as defined in claim 5 with means for heating the mixture also subject to the conjoint control.

7. In combination with an internal combustion engine a throttle for controlling the supply of combustible mixture thereto, fuel admission means, means to supply cold air and means to supply warm air for the generation of the combustible mixture and a valve controlling the cold air supply movable with but in its opening following on said throttle.

In testimony whereof, I have signed my name to this specification.

ADOLPH ROSNER.